US012784294B2

(12) United States Patent
Morar et al.

(10) Patent No.: US 12,784,294 B2
(45) Date of Patent: Nov. 3, 2026

(54) THERMAL IMAGING WITH AI IMAGE IDENTIFICATION

(71) Applicant: SCOTT TECHNOLOGIES, INC., Monroe, NC (US)

(72) Inventors: Traian Morar, Matthews, NC (US); William B. Howell, Pineville, NC (US); Darin K. Thompson, Huntersville, NC (US); Richard J. Sabacinski, Charlotte, NC (US)

(73) Assignee: SCOTT TECHNOLOGIES, INC., Monroe, NC (US)

( * ) Notice: Subject to any disclaimer, the term of this patent is extended or adjusted under 35 U.S.C. 154(b) by 41 days.

(21) Appl. No.: 18/851,840

(22) PCT Filed: Mar. 17, 2023

(86) PCT No.: PCT/IB2023/052654

§ 371 (c)(1),
(2) Date: Sep. 27, 2024

(87) PCT Pub. No.: WO2023/194826

PCT Pub. Date: Oct. 12, 2023

(65) Prior Publication Data

US 2025/0209680 A1 Jun. 26, 2025

Related U.S. Application Data

(60) Provisional application No. 63/327,170, filed on Apr. 4, 2022.

(51) Int. Cl.
*G06T 11/00* (2026.01)
*G06T 7/00* (2017.01)
(Continued)

(52) U.S. Cl.
CPC ............ *G06T 11/00* (2013.01); *G06T 7/0002* (2013.01); *G06T 7/13* (2017.01); *G06T 7/73* (2017.01);
(Continued)

(58) Field of Classification Search
None
See application file for complete search history.

(56) References Cited

U.S. PATENT DOCUMENTS 10,789,499 B2 9/2020 Han
2018/0211121 A1 7/2018 Moosaei et al.
(Continued)

FOREIGN PATENT DOCUMENTS

CN 109740444 B 7/2021
JP 2009071789 A 4/2009
(Continued)

OTHER PUBLICATIONS

3rd Gen Night Vision VS Thermal—Bing video, Jul. 27, 2015, 1 Page.
(Continued)

*Primary Examiner* — Tammy Goddard
(74) *Attorney, Agent, or Firm* — Weisberg I.P. Law, P.A.

(57) ABSTRACT

An imaging unit is described. The imaging unit includes processing circuitry configured to determine an edge overlay including at least one detected edge of at least one object having at least one object edge. Composite image is determined. The composite image includes at least a first layer and a second layer, the first layer being configurable to show a base image including the at least one object. The second layer being configurable to show the determined edge overlay. In addition, the at least one detected edge is laid over the at least one object edge of the at least one object.

20 Claims, 6 Drawing Sheets

(51) Int. Cl.
*G06T 7/13* (2017.01)
*G06T 7/73* (2017.01)
*G06V 20/50* (2022.01)

(52) U.S. Cl.
CPC .... *G06V 20/50* (2022.01); *G06T 2207/10048* (2013.01); *G06T 2207/20084* (2013.01); *G06T 2207/20212* (2013.01); *G06T 2207/30168* (2013.01); *G06T 2207/30244* (2013.01)

(56) References Cited

U.S. PATENT DOCUMENTS

| | | | | |
|---|---|---|---|---|
| 2021/0225081 | A1 | 7/2021 | Tang | |
| 2023/0149599 | A1* | 5/2023 | Rioult | A61L 2/087 424/423 |
| 2023/0410422 | A1* | 12/2023 | Aron | G01B 11/2513 |
| 2023/0410461 | A1* | 12/2023 | Gollahalli Ananda | G06V 20/20 |
| 2023/0419673 | A1* | 12/2023 | Chan | H04N 7/183 |

FOREIGN PATENT DOCUMENTS

| | | | |
|---|---|---|---|
| JP | 2012120047 | A | 6/2012 |
| WO | 2021174060 | A1 | 9/2021 |

OTHER PUBLICATIONS

International Search Report for PCT International Application No. PCT/IB2023/052654, mailed on Jun. 13, 2023, 4 pages.

Lundgren, "Drawing Basics: How to Find Angles and Proportions in Linear Perspective", retrieved from the internet on Nov. 26, 2024], URL <https://alvalyn.com/drawing-basics-find-angles-proportions-linear-perspective/>, 12 pages.

MobiSys 2020—See Through Smoke Robust Indoor Mapping with Low-cost mmWave Radar—YouTube Video, Jun. 16, 2020, 1 page.

Thermal-Imaging & Digital Night Vision, [retrieved from the internet on Nov. 26, 2024], URL <Thermal-Imaging & Digital Night Vision (optics4birding.com)>, 4 pages.

* cited by examiner

THERMAL IMAGING WITH AI IMAGE IDENTIFICATION

CROSS REFERENCE TO RELATED APPLICATIONS

This application is a national stage filing under 35 U.S.C. 371 of PCT/IB2023/052654, filed 17 Mar. 2023, which claims the benefit of U.S. Provisional Application No. 63/327,170, filed 4 Apr. 2022, the disclosure of which is incorporated by reference in its/their entirety herein.

TECHNICAL FIELD

This disclosure relates to image processing, in particular, to a method, apparatus, and system for thermal imaging and identification of objects in thermal images, such as for example as may be used with first responder personal protective equipment (PPE).

INTRODUCTION

Edge detection is an image processing technique used for determining object edges (such as lines, curves, intersection of one or more planes). Typical edge detection technology uses visible light images (i.e., images that are generated and/or detected and/or sensed using visible light). However, visible light images may be affected by environmental conditions, e.g., low visibility. With respect to first responders engaged at the site of an emergency, low visibility may be produced by smoke in a space such as smoke emanating from a fire, chemical fumes in an area, and/or low light intensity conditions such as during nighttime.

Night vision devices, including infrared (IR) technology, may be used to improve image processing, e.g., by producing light intensified images. However, light intensified images of the night vision devices are typically green and may cause objects in the image to become indistinguishable and/or invisible, even when night vision is used in combination with edge detection. Indistinguishable and/or invisible objects may be of particular importance in certain situations, where safety is critical. For example, a firefighter using a night vision device may be unable to see (and/or distinguish) an egress point and become trapped in a building where visibility is low, e.g., where the building has no illumination, or where smoke is present. In another example, an operator of a chemical plant may be unable to detect an escape gate while trying to climb out of a confined space emanated with chemical fumes.

In sum, typical technologies such as visible light imaging and edge detection are not capable of producing images that can be used in low-visibility environments where the safety is critical.

SUMMARY

Some embodiments advantageously provide a method, apparatus, and system for integrating edge detection, machine learning, and neural networks such as to determine (e.g., identify in real time) features in an image such as a thermal image and/or determine a floor plan (e.g., apply information associated with the image to an ad hoc map). The floor map may be usable in navigation such as by one or more users of the apparatus/system. In some embodiments, the apparatus/system is integrated with and/or part of a personal protective equipment such as a respirator for firefighter.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
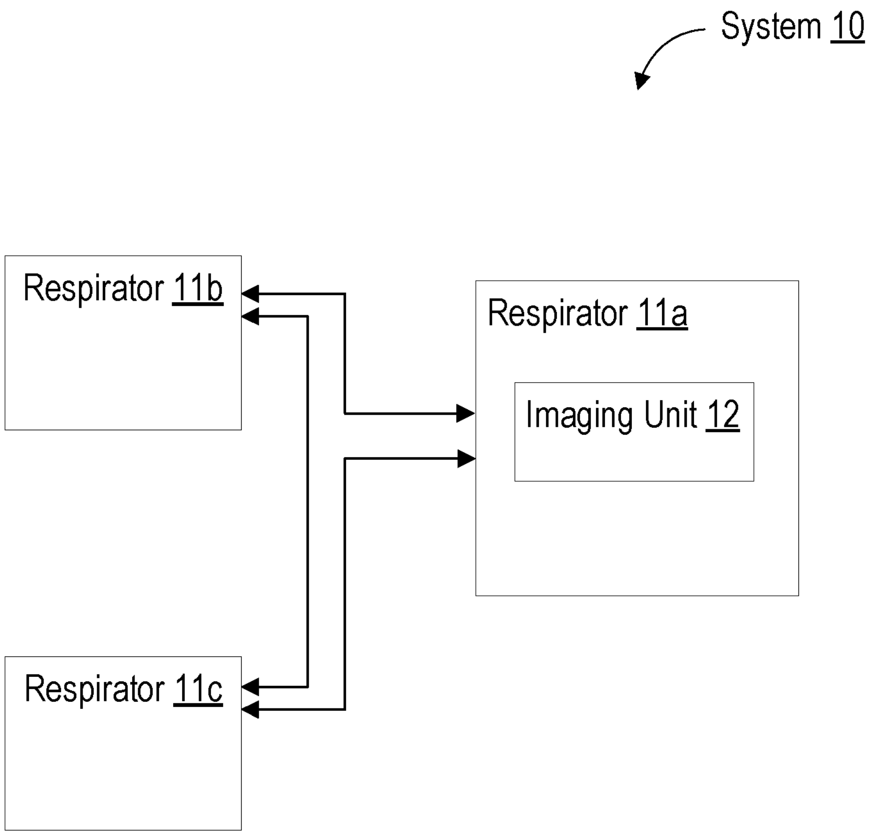
FIG. 1 shows an example system including at least a respirator and an imaging unit according to the principles of the present disclosure.

Apparatuses, methods, and systems are described for displaying video information to an end user wearing an imaging unit (IU) including an image sensing unit such as a thermal imaging camera (TIC) and/or display such as display system (i.e., in-mask display (IMD)). The IU may part of a respirator (e.g., Self-contained breathing apparatus (SCBA) mask, Vision C5 system, etc.).

Before describing in detail exemplary embodiments, it is noted that the embodiments reside primarily in combinations of apparatus components and processing steps for integrating edge detection, machine learning, and/or neural networks such as to determine features in an image and/or a composite image and/or a floor plan. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, “in communication with” and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

The term respirator may refer to any equipment (and/or device) such as personal protective equipment (PPE) and may include masks, full-face mask, half-face mask, full-face respirators, equipment used hazardous environments, etc. The term “imaging unit” (IU) used herein may be any kind of device and/or may be comprised in any other device such as a personal protective equipment (PPE). However, IU is not limited as such and may be standalone. Further, IU may refer to any device configurable to provide functions/features to interface at least with a user and/other devices. The term “edge overlay” may refer to information associated with at least one edge of an object. The information may include one or more of the following elements associated with the least one edge and/or object: vector information such as information of vectors associated with the object, orientation of edges and/or the object, an array of edges, an arrangement of edges, etc. An edge overlay may be a layer including the information associated with the at least one edge. The edge overlay may further be transparent (or of any color) and/or be devoid of information in an area where no information associated with the at least one edge is placed/displayed/located. Edge overlay may also refer to a data structure including the information associated with at least one edge of an object (e.g., where each edge is determined in relation to at least another edge). The edge overlay may be used as a layer that can be configured to be stacked on top of another layer (e.g., a base image) and/or used to determine a composite image.

Composite image may refer to the combination of more than one images (and/or information) such as in a layered and/or stacked structure. For example, a composite image may include a first layer and/or a second layer, etc., where the first layer may be a base image such as an image corresponding to an image provided by a camera (e.g., thermal camera), and the second layer may be another image and/or a combination of edges (and/or information associated with edges). However, a composite image is not limited as such and may be any combination of images and/or information and/or data. Further, a composite image is not limited to being a two-dimensional image and may include more than two dimensions such as a three-dimensional image, virtual reality image, volumetric image, etc.

The term object may refer to any object and may include one or more edges. In a nonlimiting example, the term object may refer to a human, animal, a structure such as a dwelling, an object within the structure such as a window, door, gate, wall, ceiling, floor, roof, aperture, stairs, ladders. Object may also refer to any sign such as markers, decals, symbols that may be associated with standardization and safety such as those promulgated/provided by material safety data sheets (MSDS), Americans with Disability Act (ADA), Occupational Safety and Health Administration (OSHA), American National Standards Institute (ANSI), National Fire Protection Association (NFPA), etc. Further, structure category may refer to a type of structure such as a building, house, apartment, warehouse, airport, seaport, retail space, a plant such as a chemical plant, power plant, water plant, etc.

In addition, the term unique identifier may refer to decals and/or markers and/or signs and/or symbols as described in the present disclosure. Further, the term dimension information may include any information associated with an object where the information is related to at least one dimension and/or shape of the object, e.g., angles, shapes, plane (x, y, z).

Thermal images (i.e., infrared (IR) thermal images) differ from visible light images. More specifically, thermal-imaging devices sense/capture invisible heat radiated from objects and do not require light (as visible light imaging devices) to capture images. That is, thermal imaging devices may be used in any condition of lighting. Further, thermal imaging may be used in industrial environments and/or by first responders and/or providers of emergency services. Thermal imaging devices may be used by firefighters at least because the imager, e.g., operating in a range of 8 to 14 micron, is generally insensitive to smoky conditions associated with fire that would otherwise obscure the image. The image may be provided in shades of white, grey, and black. The image may be colorized to highlight environmental conditions such as “hot spots.” Further, thermal imaging may be integrated with edge detection processes/algorithms to further provide details about objects in the image.

Edge detection processes/algorithms may be tuned using parameters associated with image processing. In addition, thermal imaging integrated with edge detection of objects may be beneficial at least because thermal conditions may be correlated to certain areas of a structure where a fire occurs. For example, a high temperature gas layer at a ceiling of the structure where the fire is present may be shown in a composite image that includes a base image with thermal indicators (e.g., coloring of the image indicating the high temperature of the gas) and edges laid over the base image indicating the edges of the ceiling. In addition, thermal imaging integrated with edge detection may be beneficial at least because a composite image may show different hazards associated with different conditions of objects such as doors that are open, confined stairways, hot doors, etc. Characteristics of objects such as transparency (e.g., of a pane of glass) that are detected by thermal imaging (and undetected by visual light imaging) may be further enhanced by overlaying detected edges on the object on the thermal image.

Edge detection and thermal imaging may also allow use of lower resolution camera cores which may be low power consumption camera cores. Low power consumption is important in firefighting as firefighters using thermal imaging may be without access to a charging source for long periods of time. In addition, lower power consumption of thermal imaging processes is also important for other users, such as users of thermal imaging devices in industrial environments, pipeline operations, HAZMAT operations, storage/warehousing, in remote locations and/or locations where a power source is not available. Therefore, a combination edge detection processes to analyze thermal images efficiently (i.e., with low power consumption) while still providing information that is relevant to end users is described.

In some embodiments, objects (e.g., on a thermal image) are identified and/or displayed, e.g., so that the end user can make informed decisions about a next step to be taken for a mission. In some other embodiments, visual information (e.g., associated with a composite image including a thermal image) may be accompanied by audio related information in a Bone Conduction Headset (BCH) system for products so equipped.

Referring now to the drawing figures, in which like elements are referred to by like reference numerals, there is shown in FIG. 1 a system 10 including at least one respirator 11 (i.e., respirator 11*a*) including an imaging unit 12. Each respirator 11 (i.e., respirators 11*a*, 11*b*, 11*c*) may be configured to communicate, e.g., via imaging unit (IU) 12 (and/or any of its components) with another respirator. For example, respirator 11*a* may be configured to communicate with respirator 11*b* and/or respirator 11*c*. Respirator 11*b* may be configured to communicate with respirator 11*a* and/or respirator 11*c*. Similarly, respirator 11*c* may be configured to communicate with respirator 11*a* and/respirator 11*b*. Although three respirators 11 are shown, system 10 is not limited as such and may include any quantity of respirators 11. Further, although not shown, each of respirators 11*b*, 11*c* may include an IU 12.

In a nonlimiting example, respirator 11*a* may be worn by a firefighter that communicates, such as via IU 12, with another firefighter wearing respirator 11*b*. Respirator 11*a* may be configured to transmit, such as via IU 12, an image (such as a composite image including one or more layers and/or a thermal image and/or edge detection information associated with the thermal image) to the corresponding IU 12 of respirator 11*b*. The IU 12 of 100*b* may be configured to display the composite image transmitted by the IU 12 of respirator 11*a*. That is, any respirator 11 (and/or IU 12) may be configured as respirator 11*a* (and/or IU 12*a*) to transmit the image and/or be configured as respirator 11*b* (and/or corresponding IU 12) to receive/display the image.

Figure 2:
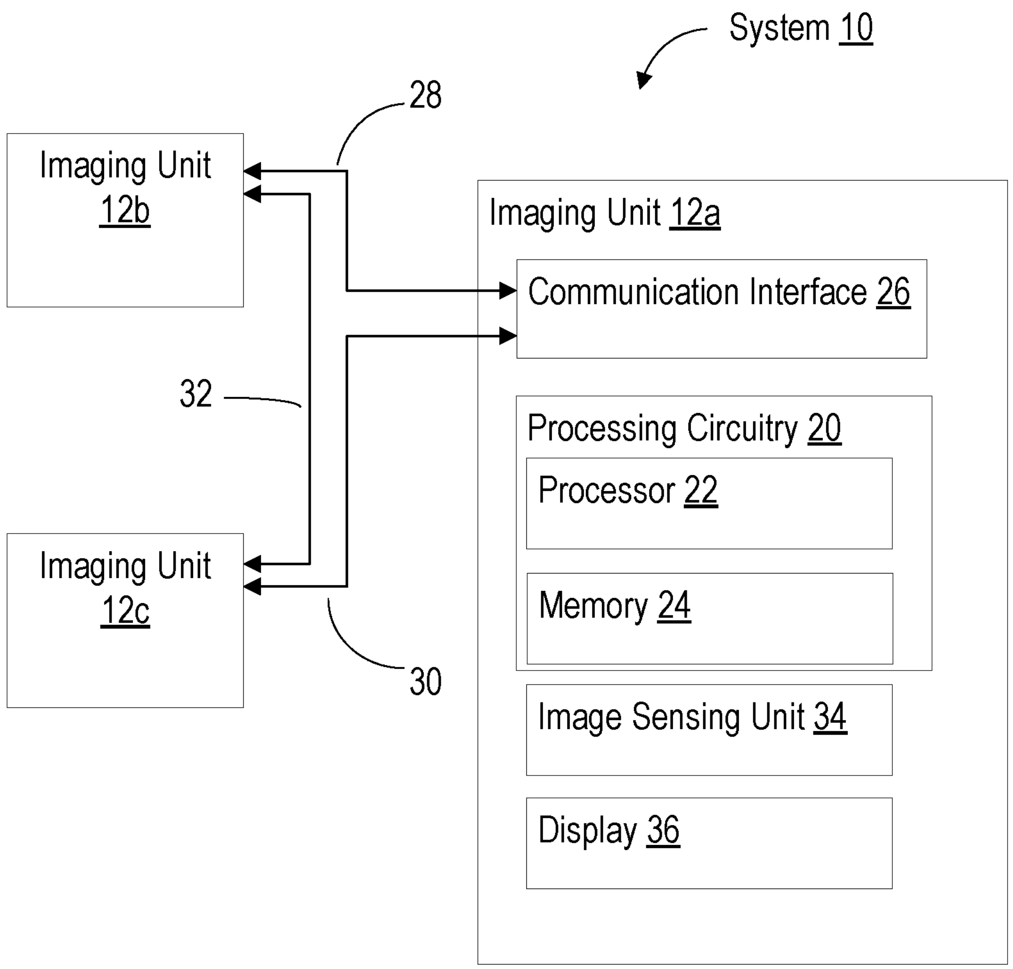
FIG. 2 shows a schematic diagram of an imaging unit in communication with other imagining units according to the principles of the present disclosure.

FIG. 2 shows a schematic diagram of a system 10 according to one or more embodiments. System 10 includes one or more IUs such as IU 12*a*, 12*b*, 12*c* (collectively referred to as imaging unit 12) where IU 12*a* may be in direct communication with each of IUs 12*b* and 12*c* such as via one or more of wireless and/or wired communication using one or more communication protocols. Similarly, IU 12*b* may be in direct communication with IU 12*c* such as via one or more of wireless and/or wired communication using one or more communication protocols.

IU 12 (e.g., IU 12*a*) includes processing circuitry 20. The processing circuitry 20 may include a processor 22 and a memory 24. In particular, in addition to or instead of a processor, such as a central processing unit, and memory, the processing circuitry 20 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 22 may be configured to access (e.g., write to and/or read from) the memory 24, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Further, IU 12 (e.g., IU 12*a*) may include software stored internally in, for example, memory 24. The software may be executable by the processing circuitry 20. The processing circuitry 20 may be configured to control any of the methods and/or processes and/or features and/or tasks and/or steps described herein and/or to cause such methods, and/or processes and/or features and/or tasks and/or steps to be performed, e.g., by IU 12. In a nonlimiting example, processing circuitry 20 is configured to determine an edge overlay including at least one detected edge of at least one object having at least one object edge; and/or determine a composite image. The composite image one or more layer. Each layer may be configurable to show at least one of an image such as a base image including the at least one object and the edge overlay. Processor 22 corresponds to one or more processors 22 for performing IU 12 functions described herein. The memory 24 is configured to store data, programmatic software code and/or other information described herein. In some embodiments, the software may include instructions that, when executed by the processor 22 and/or processing circuitry 20, causes the processor 22 and/or processing circuitry 20 to perform the processes described herein with respect to IU 12.

In addition, the IU 12 (e.g., IU 12*a*) may include a communication interface 26 configured to communicate at least with another IU 12, e.g., 12*b*, 12*c*, such as via one or more of wireless and/or wired communication using one or more communication protocols. More specifically, the communication interface 26 of IU 12*a* may communicate with the IU 12*b* via communication link 28. In addition, the communication interface 26 of the IU 12*a* may communicate with IU 12*c* via communication link 30. Similarly, IU 12*b* may communicate with IU 12*c* via communication link 32. Communication link 30 may be a wireless communication link that uses as suitable wireless communication protocol.

IU 12 (e.g., IU 12*a*) may also include image sensing unit 34 and/or display 36. Image sensing unit 34 and/or display 36 may be configured to communicate with any component/element of IU12, e.g., image sensing unit 34 and/or display 36 may be in communication with processing circuitry (and/or processor 22 and/or memory 24) and/or communication interface 26. Image sensing unit 34 may be configured to capture and/or detect and/or record and/or sense and/or determine any image such as a thermal image. Image sensing unit 34 may further be configured to detect an edge of at least one object having at least one object edge. In a nonlimiting example, image sensing unit 34 may be a camera (e.g., a thermal camera) but is not limited as such and can be any device. Display 36 may be configured to display one or more images such as a composite image and/or provide audio. The composite image (and/or elements of the composite image) may be sensed and/or recorded by image sensing unit 34 and/or transmitted by another IU 12 (such as IU 12*b*, IU 12*c*) to imaging unit 12*a* and/or trigger to be displayed on display 36. In a nonlimiting example, the composite image may be displayed to a wearer of a respirator 11 via display 36. Further, the composite image may include one ore more layers and/or a thermal image and/or an edge overlay one or more edges (e.g., detected by image sensing unit 34) of at least one object having at least one object edge. In a nonlimiting example, the object may be a door (e.g., such an ingress/egress point) having one or more edges (e.g., four edges corresponding to the door frame and a floor edge).

Further, any IU 12 (e.g., IU 12*a*) may be configured to communicate with the processing circuitry 20, the processor 22 and/or the memory 24 and/or image sensing unit 34 and/or display 13 to perform the processes, features, tasks, and/or steps described in the present disclosure.

In addition to the features of the thermal imaging camera (i.e., image sensing unit 34) and mask display (i.e., display 36), the following may be used/performed:

Personal Computer (PC) systems running Windows or Linux or any other operating system.

Microcontroller processor board MCU (i.e., processing circuitry 20) used in an end user embedded system (i.e., imaging unit 12).

A thermal image optimized edge detection algorithm/process that is sensitive to differences identified in thermal images, adjusting for anomalies such as glass and/or cleaning up thermal specific noise in the image.

Edge detection algorithms (which may be developed in C, C++, Python or Matlab and/or running on Windows and/or Linux operating systems (OS) and/or Apple iPhone Operating system (iOS) and/or Android OS). That is, edge detection processes may be integrated with (and/or included in) processing circuitry such as processing circuitry 20 of IU 12.

Testing using thermal imaging captured from cameras on a PC and/or other units such as IU 12.

Learning performed using IU 12 and/or other units such as a PC where thermal images and edge results are evaluated using a quality algorithm (i.e., a quality detection process).

An edge detection process (e.g., edge detection software) that is portable, e.g., software ported to (i.e., software running in) embedded systems (e.g., Vision C5 Sight 2.0) using microcontrollers such as processing circuitry 20.

Wireless connectivity to transmit images either to command or to other users (e.g., response team members, or rapid intervention team (RIT) rescuers).

Figure 3:
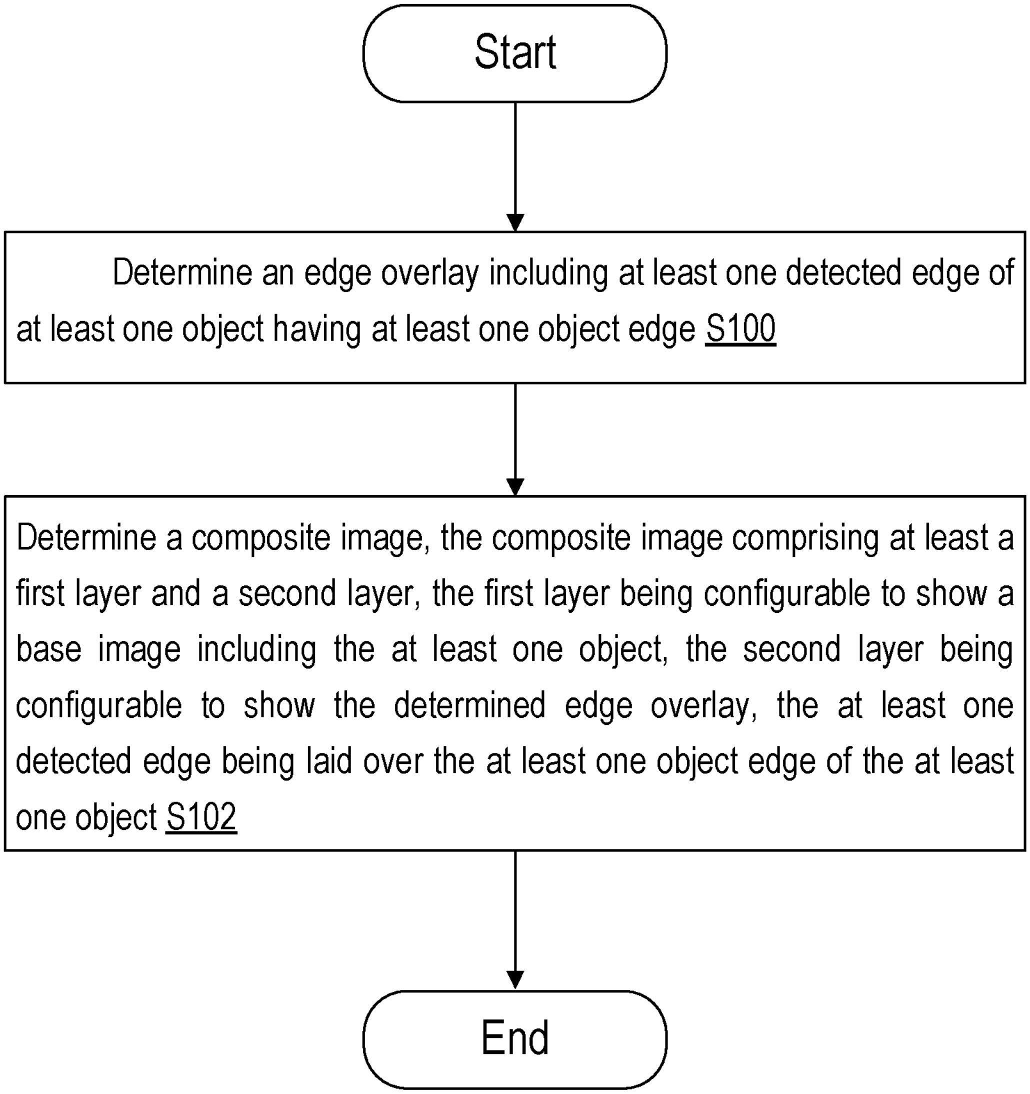
FIG. 3 shows a flowchart of an example process in an imaging unit according to the principles of the present disclosure.

FIG. 3 shows a flowchart of an exemplary process (i.e., method) in IU 12. One or more blocks described herein may be performed by one or more elements of IU 12 such as by one or more of processing circuitry 20, processor 22, memory 24, communication interface 26, image sensing unit 34, and display 36. IU 12, such as via one or more of processing circuitry 20, processor 22, memory 24, communication interface 26, image sensing unit 34, and display 36, is configured to determine (Block S100) an edge overlay including at least one detected edge of at least one object having at least one object edge; and determine (Block S102) a composite image. The composite image includes at least a first layer and a second layer. The first layer is configurable to show an image such as a base image including the at least one object. The second layer is configurable to show the determined edge overlay. The at least one detected edge is laid over the at least one object edge of the at least one object.

In some embodiments, the method further includes at least one of: receiving, such as via communication interface 26 and/or image sensing unit 34, the at least one detected edge of at least one object; and displaying, such as via display 36, the determined composite image.

In some other embodiments, the method further includes analyzing edge detection information (e.g., a plurality of edges associated with one or more objects) to determine the edge overlay. Analyzing the edge detection information includes: analyzing a plurality of edge detection processes; and determining at least one edge detection process that meets a quality parameter (e.g., an image clarity parameter).

In one embodiment, the method further includes performing a plurality of provisional assignments based on machine learning. Performing the plurality of provisional assignments includes: determining an edge arrangement (e.g., edge orientation forming an object shape, edge orientation in space) of the at least one detected edge of the at least one object; and assigning the edge arrangement to at least one of at least one object category (e.g., window, door, sign, etc.) and a structure category (e.g., a warehouse, industrial building, chemical plant, power plant, etc.)

In another embodiment, the method further includes determining, using neural networks, the at least one detected edge of at least one object from a dataset of images.

In some embodiments, the method further includes: filtering out a group of objects of a plurality of objects from an area of the base image, where the at least one object is part of the plurality of objects; and extracting information from the area of the base image using at least one image parameter (e.g., color, brightness, gradient features, etc.).

In some other embodiments, the method further includes determining a floor plan of at least one structure associated with the at least one object. The floor plan includes at least one of the at least one object (e.g., window), the at least one detected edge (e.g., windowsill, window rail, window pane, window rail), object category information (e.g., window location in a building), structure category information (e.g., power plant location near hospital), directional information (e.g., turn toward exit), and unique identifiers (e.g., decals, markers, identification symbols).

In one embodiment, a relative position of the imaging unit with respect to the at least one object is determined based at least on dimension information of the at least one object (e.g., perspective angles).

In another embodiment, a signal is received (such as via communication interface 26) from a plurality of sensory systems (e.g., LIDAR, GPS, LoRa). The signal including sensory information (e.g., distance to the object, location of the object) usable to determine the composite image.

In some embodiments, the base image is a thermal image (e.g., captured by image sensing unit 34 of IU 12 or received from another IU 12).

In some embodiments, an image capture process may be performed, such as via processing circuitry 20 and image sensing unit 34 of IU 12 that is part of a respirator 11 such as a mobile/wearable facemask system. The image capture process may include edge detection. Any one of the image capture process and/or edge detection may be part of another IU 12 such as a wearable either in the mask, on the user, or in an SCBA electronics package. IU 12 may be configured to display a composite image (i.e., including the captured image and information associated with the edge detection). For example, a user of IU 12 may see a live image with the edge detection output overlaid in a mask display (i.e., display 36). The thermal image and edge detection result may be made available to remote viewers (e.g., a commander) via communication interface 26, e.g., by wireless transmission. Thermal images may be selectively captured in memory 24, e.g., based on a quality detection process, triggered by the user and/or command, and may be used for learning in a separate system, e.g., another IU 12.

In one embodiment, any one of the following is performed: analyze edge detection information; assign identification to the objects such as a provisional assignment; provide alarms about dangerous situations to the user; and plot plan (e.g., a floor plan) for use in addressing the emergency and/or issues associated with the location of responders.

In another embodiment, several edge detection processes may be performed, where one the edge detection process may provide a better visual result than another. Different results may be due to environmental conditions (e.g., smoke, water fog, obstacle congestion) and/or other factors (e.g., present during machine learning of collected data). Multiple edge detection processes may be tested in a predetermined environment, and the edge detection process that meets a predetermined quality parameters (e.g., clearest image) may be selected. A number of provisionally assigned images may be maximized. The provisionally assigned imaged with the most assigned images (i.e., the fewest ambiguous images) may be selected. Any edge detection process may be selectable by the user, e.g., the user being able to toggle edge detection processes based on a preferred view.

In some embodiments, IU 12 may be configurable with a "training mode" for use in preparing a user/trainee. The training mode may be used in training exercises such flashover, live fire, confidence course, and other training scenarios. In the training mode, a user such as a training officer may be able to "place" objects in view of the trainee virtually and/or see what presented to a trainee, e.g., on display 36.

The following is a list of nonlimiting example provisional assignments, e.g., from a machine learning algorithm:

- Two rectangles of approximately the same size, stacked one above the other or beside each other are windows.
- A rectangle about seven feet (±0.5) tall and 2 feet or greater across is a door.
- A smaller rectangle, about 12" wide and 8" tall located over a figure assigned as a door is assigned as being an "exit" sign. The combination may be flagged as an egress point.
- A series of stacked but staggered right angles, each less than a foot tall is a stairway.
- An opening in a wall would be considered an aperture which may be used to prompt the user to further classified the opening.
- A rectangular figure that shows a reflection of a user (e.g., in IR), is a window.
- The intersection of a floor and a wall or a ceiling and a wall is also an edge and would be indicated by a line on the display.

Additional classifications of identifiable structures (e.g., a structure category) may include warehouse, industrial structure, chemical structure such as a chemical plant, power structure such as a power plant, retail structure, etc. The identifiable structures may be populated by a user such as a member of a fire department that configures IU 12 during preplanning exercises.

In some other embodiments, in a warehouse category a 42" square structure 1 to 5 feet tall may be a pallet of goods. Further, a barrel seen from one side would present a rectangle about 23" across and 35" tall. Further, a combination of figures, rectangles and an oval (e.g., on top of the rectangle), may be assigned as a person.

In one embodiment, identification of identifiable structures may be performed by using a neural networks (NN) process, e.g., to teach IU 12 a safe area such as outside the area where the first response is being conducted such as in an office environment. The NN process may be trained by feeding images, e.g., in a safe area, and then getting a response during runtime.

In some embodiments, a probability of certainty is determined, such as via processing circuitry 20 and/or processor 22 and/or memory 24. For example, the probability may indicate a percentage (e.g., 90-98%) of certainty that the object is a door, window, person, etc. In some other embodiments, the determined probability is without identifying at runtime angles, size, etc. of the object.

In one embodiment, at least one of the following may be performed, such as via processing circuitry 20 and/or communication interface 26 and/or image sensing unit 34 and/or display 36:

- Use a dataset of the images and/or shapes to be recognized (e.g., a dataset such as a Modified National Institute of Standards and Technology (MNIST) Dataset, a data set from an emergency responders' point of view (POV)).
- Train the NN process using images from the dataset (e.g., where an image is determined to be a door, a person, etc.) Training may be performed during a time that is not runtime.
- Run the NN process to recognize images received during runtime. The NN may match (e.g., quickly match such as in msec or sec) a new image to an image already "learned" during training.

In another embodiment, objects may be filtered out, such as via processing circuitry 20 and/or communication interface 26 and/or image sensing unit 34 and/or display 36, based on area occupied in an image. Certain areas such as larger areas may be focused on, e.g., to extract information (e.g., hidden information) from the image using image parameters such as color, brightness, and gradient features. Filtering out and/or focusing and/or extracting may be performed using edge detection, such as via processing circuitry 20 and/or communication interface 26 and/or image sensing unit 34 and/or display 36.

In some embodiments, a plan such as an ad hoc floor plan may be built/determined/shown, such as via processing circuitry 20 and/or communication interface 26 and/or image sensing unit 34 and/or display 36. The plan may be of a structure, e.g., in which a user will use IU 12, outside the structure where a commander will be working. The plan may include any object, including objects of a structure, and any other information associated with a structure and/or objects. For example, the plan may also be configurable, e.g., where a user may add comments to a data file associated with the floor plan such as to identify and/or label a locked steel door. A plotting program may be used to generate the plan, such as via processing circuitry 20 and/or communication interface 26 and/or image sensing unit 34 and/or display 36. IU 12 and/or the plotting program may be coupled with sensors built into a PPE in use, e.g., via communication interface 26, to further give context and/or provide any directional indication, such as via processing circuitry 20 and/or communication interface 26 and/or image sensing unit 34 and/or display 36. For example, an x-y-z accelerometer, e.g., connected to IU 12 via communication interface 26 and/or as part of processing circuitry 20, may be used to provide turn information (e.g., when proceeding down a corridor to indicate a door is "on your right"), such as via display 36. In another nonlimiting example, the IU 12 (and/or display 36) and/or plan may be configured to provide an indication on the display of "which way is up", such as via display 36.

In some other embodiments, any image such as an image (e.g., including a floor plan) that is displayed on display 36 may include markers and/or decals such retroreflective decals. The markers and/or decals may have a unique shape and be a unique shape readily identifiable such as by a detector (i.e., IU 12 performing edge detection). In a nonlimiting example, a triangle would be a choice. Other shapes with more sides may be used. Further, an edge detection process, e.g., perform by processing circuitry 20, may determine a proximity of three angles totaling 180 degrees, to identify a marker/decal as a triangle.

In one embodiment, an identification symbol may be incorporated into an identifier (i.e., marker/decal), such as via processing circuitry 20 and/or communication interface 26 and/or image sensing unit 34 and/or display 36. The incorporation may be used to supplement information available to the edge detection process, e.g., performed by IU 12.

For example, a combination of marker and identifier could signify a danger ahead, a weakened floor, a cache of flammable materials, etc. IU 12 may be configured to provide an alarm message, such as via processing circuitry 20 and/or communication interface 26 and/or image sensing unit 34 and/or display 36. The alarm message may be a flashing message and/or a warning on display 36. Any other messages may also be provided. Any of the markers, decals, and identification symbols may refer to a unique identifier.

Figure 4:
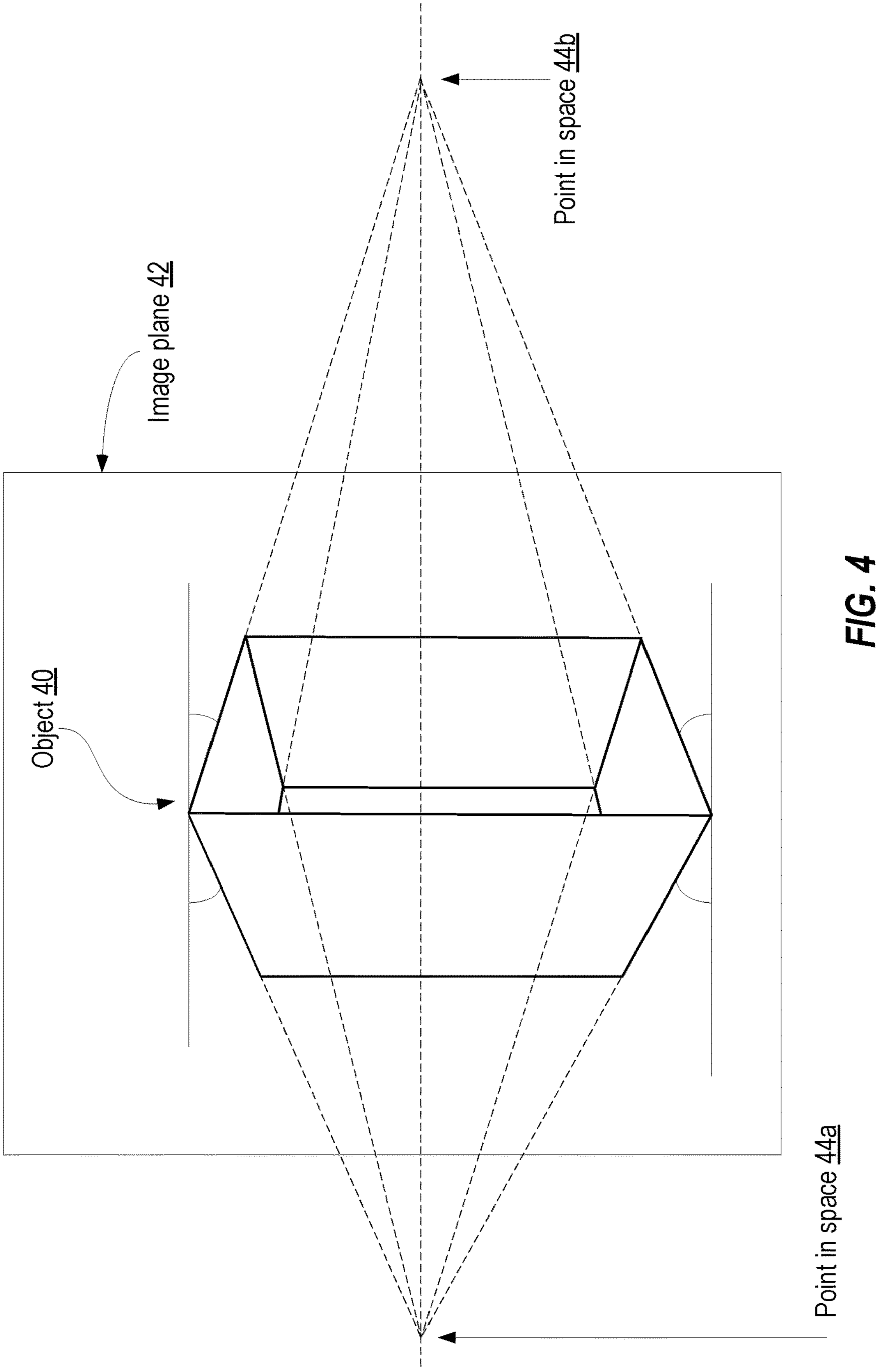
FIG. 4 shows a perspective view of an object with respect to an image plane according to the principles of the present disclosure.

In another embodiments, a relative position of IU 12 (and/or a user) with respect to the at least one object may be determined, such as via processing circuitry 20 and/or communication interface 26 and/or image sensing unit 34 and/or display 36, based at least on dimension information of the at least one object. Dimension information may include shapes, angles, location, etc. For example, rectangles, triangles, squares, and any other shapes may be used to determine if the user and/or IU 12 is facing an object straight on or at an angle. Clues to whether the user is facing the object straight on or at an angle may be derived from an analysis of the shape of the object. For example, a rectangle viewed at an angle will not appear to have 90-degree corners. Thus, a relative position of an object with respect to another object and/or point in space may be used to determine the relative position of IU 12 (and/or a user), such as via processing circuitry 20 and/or communication interface 26 and/or image sensing unit 34 and/or display 36. FIG. 4 shows an example relative position of an object 40, where the angles of the object 40 (e.g., as seen, sensed, displayed, such as via processing circuitry 20 and/or communication interface 26 and/or image sensing unit 34 and/or display 36) depend on points in space 44*a*, 44*b* and the image plane 42 (e.g., the plane from which the user sees an object, from which image sensing unit 34 senses the object).

In some embodiments, a distance between the object and IU 12 (and/or user) is determined, such as via processing circuitry 20 and/or communication interface 26 and/or image sensing unit 34 and/or display 36. The distance may be determined based on angles of the corners of an object being 90 degrees when a side of the object is in a plane that is parallel to a front plane (e.g., image plane 42) and the angles when not parallel with the front plane. For example, how far off a user is from the object may be determined. Further, a location of the object may be determined, such as via processing circuitry 20 and/or communication interface 26 and/or image sensing unit 34 and/or display 36, without the user having to reset a stance and/or get a straight-on visual of the object, e.g., to record it and determine what the object is. The distance and/or angles may be used to alert, via display 36, a user of a change in direction, a distance traveled (e.g., when a user wants to go through a door or window).

In some other embodiments, IU 12 may be configured to interact, such as via processing circuitry 20 and/or communication interface 26, with other sensory systems (i.e., be configurable to establish, maintain, and/or terminate a connection with other sensory systems). Other sensory systems may provide data that may be used to supplement information on an image such as a composite image including a thermal image and edge detection information. Other sensory systems may include thermal imaging cameras, radar such as ultra-wideband radar, light detection and ranging (LiDAR), and ultraviolet wavelength imaging systems. Additional information from the other sensory systems may include visual information usable for interpreting an image such as base image on a first layer of a composite image. Further, machine learning and NN may be used, such as via processing circuitry 20 and/or communication interface 26 and/or image sensing unit 34 and/or display 36, to learn and/or interpret the composite image (i.e., stacked image in layers) and/or provide a provisional identification to a user.

In one embodiment, other sensory systems may include global positioning systems (GPS), Bluetooth systems, and long range (LoRa) systems. That is, interpretation of the composite (e.g., stacked image) may be further enhanced by the interaction with GPS, Bluetooth, and LoRa systems, such as via processing circuitry 20 and/or communication interface 26 and/or image sensing unit 34 and/or display 36. In one nonlimiting example, GPS, Bluetooth, and LoRa may be used to determine one or more locations of other operators/users in a hazardous space. Integrating location information and x-y-z orientation may be used to identify operators in a space and locate them on a flan (e.g., floor plan). In addition, location information and/or orientation may be integrated by layering images (i.e., in a composite image) and shown on display 36. Location may be also time stamped. The location and/or timestamp may be stored in a data base (e.g., on board) such as memory 24 and displayed on the plan.

Figure 5:
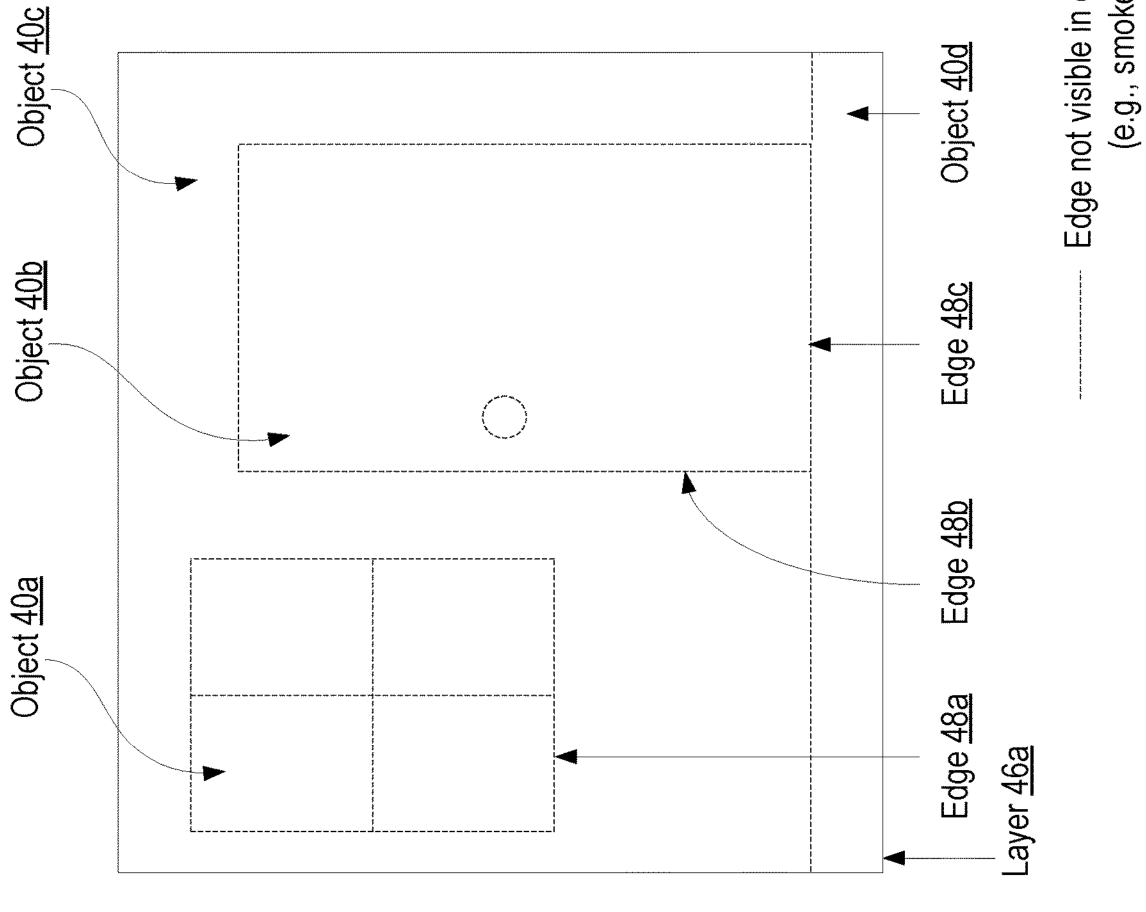
FIG. 5 shows an example layer of composite image according to the principles of the present disclosure.

FIG. 5 shows an example layer 46 (i.e., first layer 46*a*) of a composite image (e.g., of an interior of a home) according to one or more embodiments. The first layer 46*a* may be an image such as a thermal image (e.g., captured via image sensing unit 34) and may show a plurality of objects 40. Object 40*a* may be a window having at least an edge 48*a* (e.g., such as a window frame). Object 40*b* may be a door having an edge 48*b* (e.g., such as a door frame). Object 40*c* may be a wall, and object 40*d* may be a floor. Object 40*c* and object 40*d* may intersect, e.g., at edge 48*c*. At least some sections/parts of objects 40 and edges 48 may not be visible in certain conditions with and/or without use of a thermal camera. In a nonlimiting example, a fire fighter in the interior of the home may not be able to see (and/or appreciate the details of each one of) at least one edge 48 (and/or at least one object 40) when the interior of the home in low visibility conditions such as when the interior of the home is filled with smoke from a fire. When the firefighter uses image sensing unit 34 such as a thermal camera, features such as color-coding of areas indicating heat concentration may become visible, while some features such as at least some sections of objects 40 and/or edges 48 may not become visible on the thermal image of the thermal camera. Edge 48 may refer to an object edge.

Figure 6:
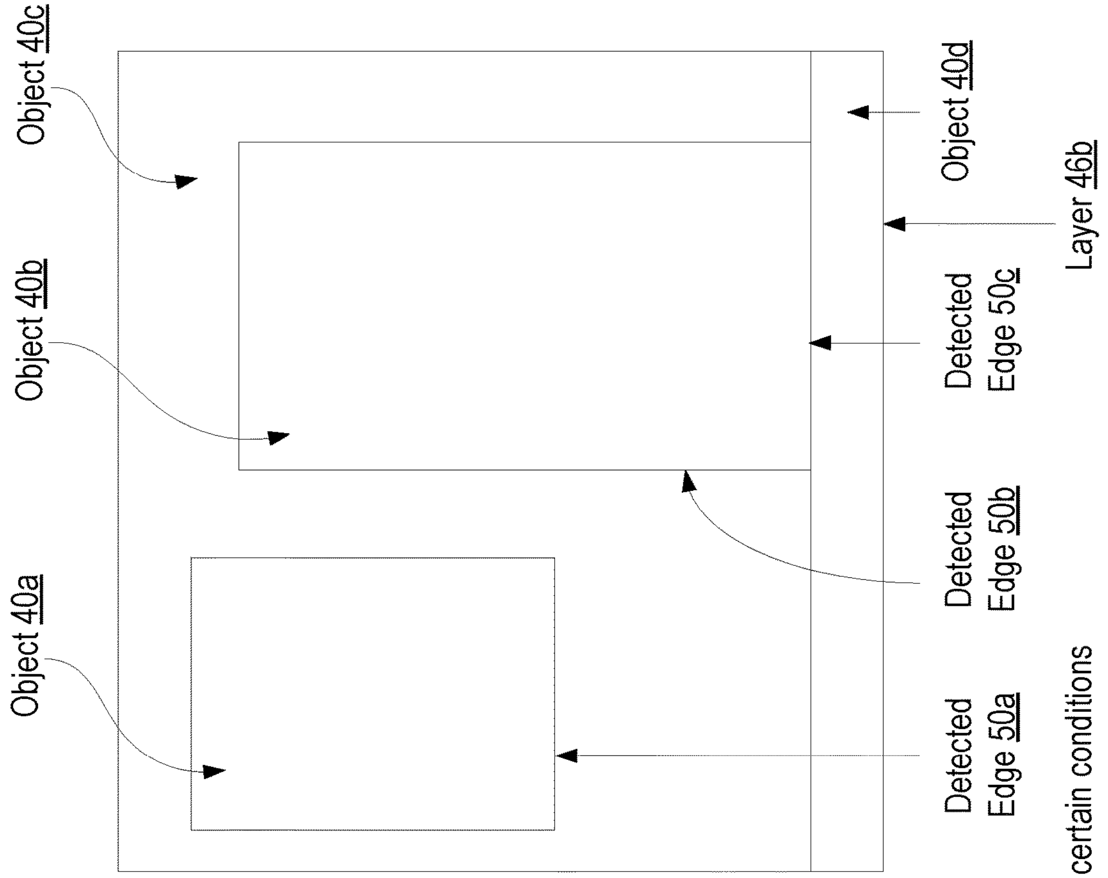
FIG. 6 shows another example layer of composite image according to the principles of the present disclosure.

FIG. 6 shows an example layer 46 (i.e., second layer 46*b*) of a composite image (e.g., of the interior of the home of FIG. 5). The second layer 46*b* may include one or more detected edges 50 (e.g., edges using an edge detection process of the present disclosure). Edges 48 (e.g., as shown in FIG. 5) correspond to detected edges 50. In a nonlimiting example, edges 48*a*, 48*b*, 48*c* correspond to detected edges 50*a*, 50*b*, 50*c*, respectively. That is, second layer 46*b* may include/be an edge overlay including at least one detected edge 50 of at least one object 40 having at least one edge 48. In the example second layer 46*b*, detected edges 50*a*, 50*b*, 50*c* are shown but second layer 46*b* is not limited as such and may include (or not include) any edge 50. In a nonlimiting example, at least one of the detected edges 50 is selectable (e.g., by a user) to be shown/hidden (such as on display 36).

Figure 7:
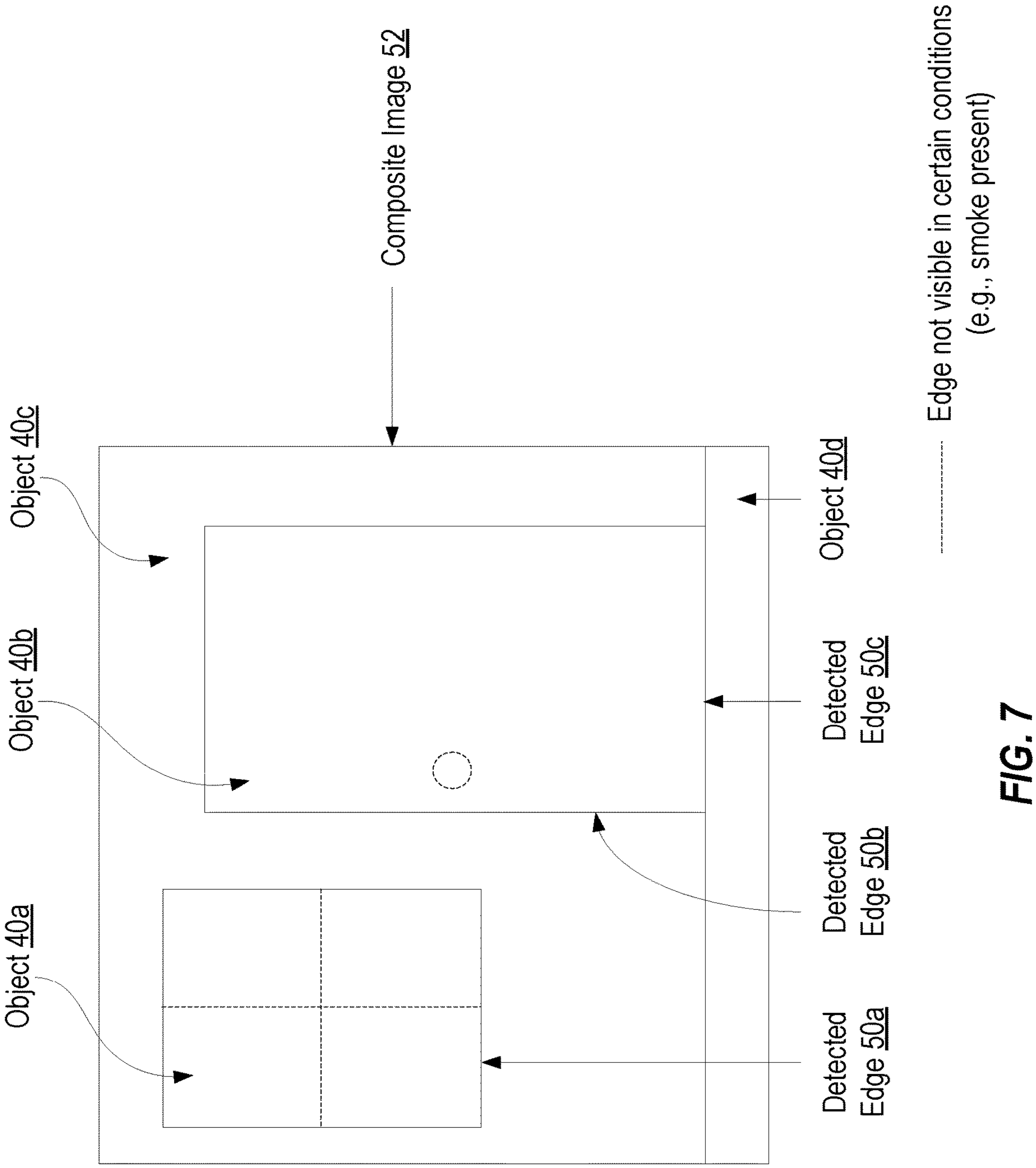
FIG. 7 shows an example composite image according to the principles of the present disclosure.

FIG. 7 shows an example composite image 52, including (i.e., being formed/composed by) the first layer 46*a* shown in FIG. 5 and the second layer 46*b* shown in FIG. 6. Second layer 46*b* (or the components of layer 46*b* such as at least one detected edge 50*b*) is laid over (i.e., stacked on top of)

the first layer 46*a* (e.g., a base layer such as a thermal image). By creating composite image 52, each one of the detected edges 50 may be shown as the corresponding edge 48 (which otherwise may not be visible due to low visibility conditions). In this nonlimiting example, detected edges 50*a*, 50*b*, 50*c* are shown in the composite image 52 and correspond to edges 48*a*, 48*b*, 48*c* of FIG. 5, respectively. Although composite image 52 includes the first layer 46*a* shown in FIG. 5 and the second layer 46*b* shown in FIG. 6, composite image 52 is not limited as such and may include any number of layers 46.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings and the following embodiments.

The invention claimed is:

1. An imaging unit comprising processing circuitry configured to:

receive image data corresponding to a thermal base image from an image sensing unit, the thermal base image including at least one object having at least one object edge:

determine, from the image data using an edge detection process, an edge overlay including at least one detected edge of at least one object having at least one object edge; and determine a composite image, the composite image comprising at least a first layer and a second layer, the first layer being configurable to show a base image including the at least one object, the second layer being configurable to show the determined edge overlay, the at least one detected edge being laid over the at least one object edge of the at least one object.

2. The imaging unit of claim 1, wherein the processing circuitry is further configured to at least one of:

cause the imaging unit to receive the at least one detected edge of at least one object; and cause at least one of the imaging unit and another imaging unit in communication with the imaging unit to display the determined composite image.

3. The imaging unit of claim 1, wherein the processing circuitry is further configured to:

analyze edge detection information to determine the edge overlay, analyzing the edge detection information including:

analyzing a plurality of edge detection processes; and determining at least one edge detection process that meets a quality parameter.

4. The imaging unit of claim 1, wherein the processing circuitry is further configured to:

perform a plurality of provisional assignments based on machine learning, performing the plurality of provisional assignments including:

determining an edge arrangement of the at least one detected edge of the at least one object; and assigning the edge arrangement to at least one of:

at least one object category; and a structure category.

5. The imaging unit of claim 1, wherein the processing circuitry is further configured to:

determine, using neural networks, the at least one detected edge of at least one object from a dataset of images.

6. The imaging unit of claim 1, wherein the processing circuitry is further configured to:

filter out a group of objects of a plurality of objects from an area of the base image, the at least one object being part of the plurality of objects; and extract information from the area of the base image using at least one image parameter.

7. The imaging unit of claim 1, wherein the processing circuitry is further configured to:

determine a floor plan of at least one structure associated with the at least one object, the floor plan including at least one of:

the at least one object;

the at least one detected edge;

object category information;

structure category information;

directional information; and unique identifiers.

8. The imaging unit of claim 1, wherein the processing circuitry is further configured to:

determine a relative position of the imaging unit with respect to the at least one object based at least on dimension information of the at least one object.

9. The imaging unit of claim 1, wherein the processing circuitry is further configured to cause the imaging unit to:

receive a signal from a plurality of sensory systems, the signal including sensory information usable to determine the composite image.

10. The imaging unit of claim 1, wherein the base image is a thermal image.

11. A method implemented in an imaging unit, the method comprising:

receiving image data corresponding to a thermal base image from an image sensing unit, the thermal base image including at least one object having at least one object edge;

determining, from the image data using an edge detection process, an edge overlay including at least one detected edge of at least one object having at least one object edge; and determining a composite image, the composite image comprising at least a first layer and a second layer, the first layer being configurable to show a base image including the at least one object, the second layer being configurable to show the determined edge overlay, the at least one detected edge being laid over the at least one object edge of the at least one object.

12. The method of claim 11, wherein the method further includes at least one of:

receiving the at least one detected edge of at least one object; and displaying the determined composite image.

13. The method of claim 11, wherein the method further includes:

analyzing edge detection information to determine the edge overlay, analyzing the edge detection information including:

analyzing a plurality of edge detection processes; and determining at least one edge detection process that meets a quality parameter.

14. The method of claim 11, wherein the method further includes:

performing a plurality of provisional assignments based on machine learning, performing the plurality of provisional assignments including:

determining an edge arrangement of the at least one detected edge of the at least one object; and assigning the edge arrangement to at least one of:
at least one object category; and
a structure category.

15. The method of claim 11, wherein the method further includes:

determining, using neural networks, the at least one detected edge of at least one object from a dataset of images.

16. The method of claim 11, wherein the method further includes:

filtering out a group of objects of a plurality of objects from an area of the base image, the at least one object being part of the plurality of objects; and extracting information from the area of the base image using at least one image parameter.

17. The method of claim 11, wherein the method further includes:

determining a floor plan of at least one structure associated with the at least one object, the floor plan including at least one of:
the at least one object;
the at least one detected edge;
object category information;
structure category information;
directional information; and
unique identifiers.

18. The method of claim 11, wherein the method further includes:

determining a relative position of the imaging unit with respect to the at least one object based at least on dimension information of the at least one object.

19. The method of claim 11, wherein the method further includes:

receiving a signal from a plurality of sensory systems, the signal including sensory information usable to determine the composite image.

20. The method of claim 11, wherein the base image is a thermal image.

* * * * *